United States Patent
Gabrys

(10) Patent No.: US 7,402,934 B1
(45) Date of Patent: Jul. 22, 2008

(54) HIGH PERFORMANCE AIR CORE MOTOR-GENERATOR WINDING

(75) Inventor: Christopher W. Gabrys, Reno, NV (US)

(73) Assignee: Revolution Motor Company, Inc., Reno, NV (US)

( * ) Notice: Subject to any disclaimer, the term of this patent is extended or adjusted under 35 U.S.C. 154(b) by 478 days.

(21) Appl. No.: 11/207,374

(22) Filed: Aug. 18, 2005

(51) Int. Cl.
*H02K 1/22* (2006.01)

(52) U.S. Cl. .................. 310/266; 310/179; 310/184; 310/259

(58) Field of Classification Search ............... 310/179, 310/184, 189, 198, 201, 202, 266, 208, 260, 310/259
See application file for complete search history.

(56) References Cited

U.S. PATENT DOCUMENTS

| | | | | |
|---|---|---|---|---|
| 3,082,337 A | * | 3/1963 | Horsley | 310/179 |
| 4,291,457 A | * | 9/1981 | Heyraud | 29/598 |
| 4,458,168 A | * | 7/1984 | Welburn | 310/185 |
| 4,473,716 A |   | 9/1984 | Jesseman | 174/117 |
| 4,694,210 A | * | 9/1987 | Elliott et al. | 310/68 R |
| 4,731,554 A | * | 3/1988 | Hall et al. | 310/67 R |
| 5,004,944 A | * | 4/1991 | Fisher | 310/266 |
| 5,097,140 A |   | 3/1992 | Crall | 290/36 |
| 5,289,069 A | * | 2/1994 | Hasegawa et al. | 310/156.37 |
| 5,311,092 A | * | 5/1994 | Fisher | 310/266 |
| 5,325,007 A | * | 6/1994 | Huss et al. | 310/180 |
| 5,504,469 A |   | 4/1996 | McGrane | 336/206 |
| 5,723,933 A |   | 3/1998 | Grundl | 310/266 |
| 5,864,198 A | * | 1/1999 | Pinkerton | 310/266 |
| 5,880,544 A |   | 3/1999 | Ikeda et al. | 310/74 |
| 5,892,307 A | * | 4/1999 | Pavlovich et al. | 310/68 B |
| 5,920,138 A | * | 7/1999 | Clifton et al. | 310/90.5 |
| 6,104,111 A |   | 8/2000 | Pullen et al. | 310/59 |
| 6,323,573 B1 | * | 11/2001 | Pinkerton | 310/178 |

* cited by examiner

*Primary Examiner*—Thanh Lam
(74) *Attorney, Agent, or Firm*—J. Michael Neary

(57) ABSTRACT

A motor-generator for converting between electrical and rotational energy includes a rotor mounted for rotation about an axis of rotation relative to a stationary a stator that magnetically interacts with the rotor. The rotor has two spaced apart rotor portions that define therebetween an armature airgap. Magnetic poles on the rotor portions drive magnetic flux across the airgap. An air core armature is located in the airgap, such that opposite sides of the air core armature face the two opposed rotating surfaces of the rotor. The air core armature has windings in which AC voltage is induced as the rotor rotates. The windings are wound with multiple individually insulated strand conductor wire wrapped with a wrapping of a thin dielectric tape film over the multiple individually insulated strand conductor wire.

20 Claims, 9 Drawing Sheets

HIGH PERFORMANCE AIR CORE MOTOR-GENERATOR WINDING

This invention pertains to motor-generators for converting between electrical and rotational energy and more particularly to specialized wire windings for motor-generators that utilize an air core armature located in an armature airgap bounded on both sides by rotating surfaces of the rotor. The wire windings provide improved, longer and more reliable operating life, especially when coupled with motor drive inverters, increased motor-generator efficiency and are easier to wind into high winding density air core armatures.

BACKGROUND OF THE INVENTION

Air core motor-generators utilizing a double rotating construction have been developed. These electrical machines eliminate magnetic induced power losses in a steel stator and provide for high efficiency through elimination of the steel stator. A circumferentially varying magnetic flux thereby does not pass through a stationary steel structure and hence no hysteresis or eddy current losses in stationary steel result. An additional benefit of air core motor-generators is that they have much lower inductance than conventional slot wound machines. This low inductance can allow for easier high-speed operation as well as faster current rise times and potentially higher power output when operating a generator.

Double rotating air core motor-generators have mostly been used in small and high speed motor applications such as for use in cameras, disc drives and similar products. New versions of these electrical machines are currently being developed for use in larger products such as for industrial and commercial applications. Unfortunately, these new motor-generators are encountering several deficiencies including unpredictable armature failures, less than optimal windings densities resulting in reduced efficiency potential and windings that are very difficult to construct.

SUMMARY OF THE INVENTION

The invention provides a new high performance air core motor-generator winding that affords longer and more reliable operating life, higher winding density and is easier to wind. The invention provides an air core motor-generator for converting between electrical and rotational energy. The motor-generator uses a rotor that is comprised of two spaced apart rotor portions that define therebetween an armature air gap, and magnetic poles on the rotor that drive flux across the air gap. Located in the armature airgap is a stator that is comprised of an armature having windings such that AC voltage is induced in the windings as the rotor rotates. To substantially reduce the eddy current losses that would otherwise occur in the actual windings, the windings are wound with Litz wire, or wire formed of bundled individually insulated conductors, wherein the conductors are electrically connected in parallel but are electrically insulated between each other along their length, and the conductors of the wire are held together by an outer insulating serve. The Litz wires replace a large diameter single strand magnet wire (copper wire with enamel film insulation) with many strands of smaller magnet wires that are insulated between each other but are all connected together at the ends. The smaller wire diameters exposed to a changing magnetic field substantially reduces the size of the eddy currents that are generated in the windings and the resulting losses. The overall cross-sectional area of conductor in the total wire can be chosen to be the same as the solid single magnet wire being replaced such that the resistive losses are the same. The special embodiments of the winding that facilitate the described benefits of the invention will be explained.

New larger air core motors for industrial applications are encountering unpredictable armature failures, despite seemingly standard manufacturing techniques. These motors are driven by a synchronous motor drive inverter. Conventional type slot wound motors have also recently employed motor drive inverters as well. The use of motor drive inverters with standard type induction motors allows for variable speed operation and can provide higher efficiency when running at reduced load. Early on use of induction motors with variable speed drives resulted in armature failures because of voltage switching spikes from the inverter. These failures are despite the fact that the inverter buss voltage and the voltage spikes were below the dielectric breakdown strength of the magnet wire used in the motors. The problem causing the failure was attributed to the corona inception voltage of the insulation. The CIV is the level at which the voltage stress becomes harmful and starts causing deterioration. New inverter duty conventional motors are now offered that overcome these failures, primarily by utilizing heavier build magnet wire enamel and using different organic and inorganic materials in the wire coating enamel that resist ozone, the product of corona discharge.

It would be very desirable to apply this same simple solution (increased and ozone resistant enamel magnet wire) to new air core motor-generators and to prevent unpredictable armature failures. Unfortunately, this is not the case. This technique has been found to be ineffective for use in new air core motors. The causes are threefold. Firstly, magnet wire, whether a single large diameter wire as used in conventional motors, or a single wire in a Litz bundle, has a specified allowable number of defects or pinholes per length in the enamel insulation. This specification is given by JIS 3003.6 and NEMA MW1000 and it is a reality of the magnet wire manufacturing process. In a conventional motor, the probably of a pinhole from one turn being aligning with a pinhole from a subsequent turn and causing failure is insignificant. However, with Litz-type windings for use in air core motor-generators, with a 500-strand wire for example, the probability of pinholes or defects per length is 500 times greater. The resulting probability of an eventual armature failure is not insignificant and these defects lead to eventual armature deterioration and failure.

Secondly, smaller diameter magnet wire strands, like those used in a Litz bundle, physically achieve a significantly thinner enamel insulation than larger solid single conductor wires because of the coating process. As a result of the thinner insulation, the dielectric breakdown strength for a Litz wire with standard single or double film build enamel is much less than for a larger solid conductor wire with a standard single or double film build. This compounds the problem.

Thirdly, applying even heavier and specialized build insulation to the strands of the Litz wire to increase the dielectric breakdown strength of the enamel is not a desirable solution even if it were effective. Such increased insulation thickness on all of the strands would substantially reduce the volume of conductor in a given size wire. The total percentage of copper to insulation would become unacceptably low and would substantially increase the resistive losses and lower the efficiency of the motor-generator. The insulation on the strands at positions near the center of the bundle or at any position that is not the outer surface of the total wire bundle would not be necessary since the breakdown and insulation failure to be prevented is not between strands but between different turns of the wire in the motor-generator. Such a solution is not practical even if pinholes or defects were not a problem.

Even if a new air core motor-generator operates properly initially, it has a probability to unpredictably deteriorate and fail. This is despite the fact that the motor drive may operate at voltages well below the dielectric breakdown strength of the Litz wire enamel insulation. For new and larger air core motor-generators to be used in industrial, commercial and residential applications, the operating voltage is higher, up to 600 volts or more, which is many times higher than small motors. The importance of the corona inception voltage and armature failure is substantial.

An additional factor also exists causing air core motors to be even more susceptible to armature failure. For a given drive, the voltage spikes and overshoot from the inverter are inversely related to the motor inductance. Air core motors physically have much lower inductance than conventional slot wound motors, making the current waveform much less smooth.

The goals of the windings are five-fold. The windings must be able to resist dielectric and CIV breakdown. The windings must be able to stay together on an air core armature structure. The windings must be able to achieve a high winding density for providing low resistance. The windings must have a high flexibility to be able to bend in sufficiently tight radius. The windings must also be able to hold the strands together for the winding process.

To overcome the armature failures while still utilizing Litz wire for reducing eddy current losses, the windings employs Litz or multiple individually insulated strand conductor wire with an outer serve insulation covering the bundle of strands. This method increases the CIV of the windings but does have significant drawbacks. The addition of the serve to the windings reduces the winding density of the armature over typical unserved Litz. Unfortunately, the serve also prevents resin impregnation of the strands that is required to form a structurally sound self-supporting air core armature that is required in double rotating air core electrical machines. It is difficult to achieve the required armature structural strength by simply bonding the windings together on their outer serves. Despite the increased resistive losses from less conductor area and structural deficiencies of this construction, the serve provides the dielectric strength, corona inception voltage (CIV) and protection against strand enamel defects that is desirable for long and reliable motor-generator operation. The serve preferably provides a dielectric strength of greater than 10,000 volts and a corona inception voltage of greater than 1,000 volts. Unlike a transformer or conventional types of electrical devices, the armature of the double rotating air core motor-generator must be self-supporting in a magnetic airgap against vibration and the induced torque from the motor-generator operation driving the rotor. In a preferred embodiment of the invention, the armature employs structural support, not from resin impregnation and saturation between all wire strands, but by winding the wires onto a nonmagnetic form that supports the served Litz wire. Relying on full resin impregnation for dielectric strength and structural strength of hundreds of small diameter strands per single wire cannot always be guaranteed to be reliable. As such, the conductors of the winding wire in one embodiment of the invention are held together on the form by an outer insulating serve constructed from resin impermeable insulating material wherein the active length portions are substantially free from resin impregnation. In some cases the form can reduce the space for windings in the magnetic airgap and reduces the potential efficiency for operation at a given level of power, since less space may be available for copper and a larger magnetic airgap may also be required. However, the use of a form with the served wire can provide the uniquely required structural strength for the air core windings and the prevention of armature deterioration and failure.

The serve, or outer insulation sheath, on the multiple individually insulated strand conductor wire used in the armature can be applied by several means, including extrusion. In a preferred embodiment, the windings utilize an outer serve comprised of wrapping of a thin film tape over the bundle of individually insulated strand conductor wire. Such film tape can include Mylar polyester film, Kapton polyimide film or other thin tape with high dielectric strength. The advantages of tape wrapping compared to an extruded serve are a thinner layer, higher dielectric strength per thickness and also a more flexible wire which is desirable for winding the armature. Compared with an extruded Tefzel serve on a 0.200" wire bundle, which would result in a 8 mil radial serve thickness, a tape wrapped Mylar serve with 50% overlap would have only a 2 mil radial serve thickness. For large diameter wire bundles, such as those used in new large air core motor-generators, the thickness of the extruded serves necessarily becomes even thicker, while tape wrapped serves remain thin and constant thickness despite the wire size. Thinner serves allow more room for additional conductor strands and increase the motor-generator efficiency. A tape film also typically provides a higher dielectric strength per thickness as well. For instance, a Mylar tape film provides 6400 volts per mil dielectric strength while an extruded Tefzel serve provides only 1800 volts per mil dielectric strength.

An additional problem encountered in double rotating air core motor-generators is that the armatures can be very difficult to wind, especially with high winding density preferred for achieving high efficiency. The addition of an extruded outer serve to the Litz motor-generator windings greatly reduces both the windings flexibility and compactability. However, the use of a tape wrapped serve allows for some sliding of the serve wrapping and helps provide some flexibility. In further aspects of the invention, the wire bundle is designed to further improve flexibility and compactability. Twisting and cabling in the bundle are typically required in the wire manufacturing process, especially when intermediate spooling is used. Twisting and cabling however reduce the flexibility and compactability and make it hard to wind sharper bends. They also cause the wires to expand outward when bent tightly and tend to lock up the individual strands making the overall wire inflexible after being bent. To overcome this problem, the lay length of the strands, or length per twist, is made large, preferably greater than 4 inches and more preferably greater than 12 inches.

The addition of an outer tape wrapped serve to the Litz wire bundle can substantially reduce its flexibility and interfere with making sharp turns in the windings during winding of the armature. The problem arises from the serve preventing the inter-bundle strands from sliding which is required for bending. I have found that to overcome this problem, in an additional preferred embodiment, the serve can be applied to the bundle with low tension. The outer insulating serve preferably utilizes a spiral tape wrapped film wherein the spiral tape wrapped film is loosely applied onto the wire with a tension of less than 10 pounds per inch of film width. The loose tension reduces the friction between strands, and allows them to slide lengthwise of each other during bending.

In yet an additional aspect of the invention, the windings flexibility can be even further increased by the wire twisting directions. It is usually not practical to fabricate whole Litz wire bundles in a single operation because it would require pulling and combining wires from up to several hundred spools. As a result, the final wire is typically formed by making smaller groups of strands that are twisted together and wound onto spools. These twisted groups are then combined and twisted together to form the winding wire. The directions of the twists of the groups and the twists of the strands in the groups are typically in the opposite direction, known as cabling. Cabling absorbs physical stress and provides resistance against end fraying of cut wire ends. In contrast, to further increase the windings flexibility and compactability, the multiple individually insulated strand conductor wire used to wind armatures for motor-generators according to the invention may be comprised of multiple groups of twisted strands, each of the groups is twisted together to form the wire and the groups of strands are twisted in the same direction as the twisting of the strands in each group. Although wires wound in this way fray at the end more easily and have less durability and wire integrity, the wire is more flexible for easier armature fabrication. It can also provide better strand nesting and allow for a slight increase in the number of strands in a given size wire, providing for a higher efficiency motor-generator. Larger air core motor-generators are unique in that they can require a large diameter winding wire and also simultaneously require tight winding bends. Bends of greater than 120 degrees and even over 150 degrees can be possible with this type of wire construction.

The armature can achieve a more highly compacted structure, even with the served bundle, by pre-compressing the wire into a rectangular cross-section with rollers, prior to winding. The pre-compression reduces the required pressure on the whole armature after winding and the serve also can help hold the wire in shape.

DESCRIPTION OF THE PREFERRED EMBODIMENT

Figure 1:
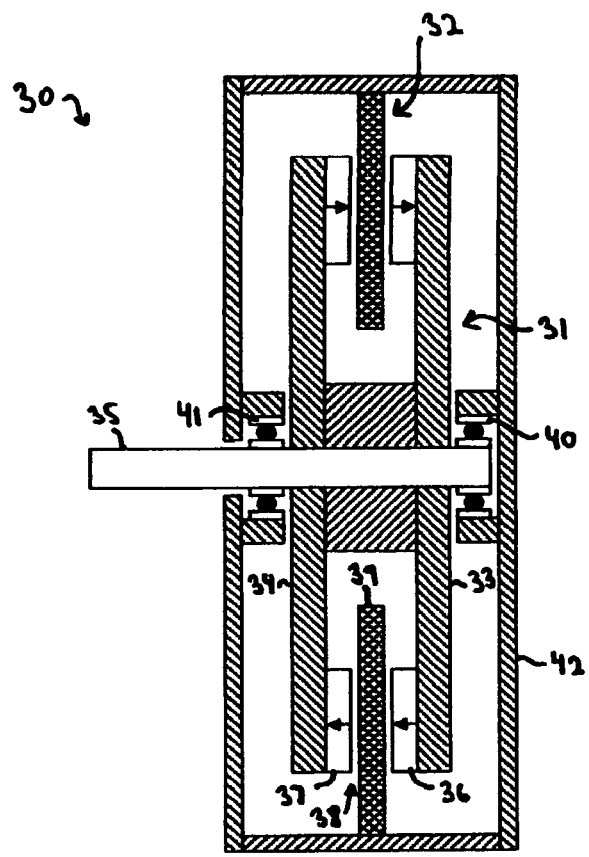
FIG. 1 is a schematic sectional elevation of an axial gap double rotating air core motor-generator in accordance with the invention.

Turning to the drawings, wherein like reference characters designate identical or corresponding parts, FIG. 1 shows an axial gap double rotating air core motor-generator 30 having a rotor 31 mounted for rotation relative to a stationary stator 32. The rotor 31 includes two spaced apart discs 33, 34 that form therebetween an armature airgap 38. Magnetic poles 36, 37 drive magnetic flux across a magnetic airgap between the pairs of magnets. The magnetic poles 36, 37 are shown as circumferential arrays of alternating, axial polarity, permanent magnets and are located on both discs 33, 34. However, magnets can alternatively be located only on one disc 33, 34 and magnetic poles can also be made of steelprotrusions on the discs 33, 34, so long as a source of magnetic flux is provided to drive magnetic flux from the poles 36, 37 to traverse the magnetic airgap. An air core armature 39 is attached and supported at its outer diameter by a housing 42, and extends into the armature airgap 38 such that it is largely bounded on both sides by rotating surfaces of the rotor 31. The air core armature 39 comprises windings such that AC voltage is induced in the windings as the rotor 31 rotates.

The discs 33, 34 are attached to a shaft 35, which is journalled by bearings 40, 41 for rotation of the rotor 31. The bearings 40, 41 are supported by the housing 42 of the motor-generator 30. The air core armature 39 is wound with windings of specialized multiple individually insulated strand conductor wire, or Litz type wire, to substantially reduce eddy currents that would otherwise occur in the windings. Specific aspects of the windings follow in the description.

Figure 2:
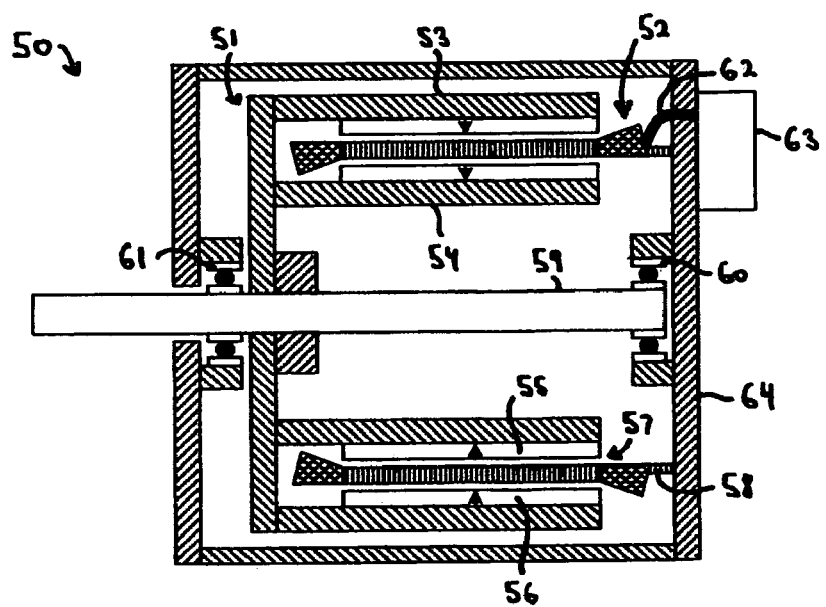
FIG. 2 is a schematic sectional elevation of a radial gap double rotating air core motor-generator in accordance with the invention.

A radial gap double rotating air core motor-generator 50, shown in FIG. 2, includes a rotor 51 mounted for rotation relative to a stationary stator 52. The rotor is constructed of two spaced apart co-rotating tubes 53, 54 that form an armature airgap 57 therebetween. Circumferential arrays of alternating, radial polarity, permanent magnets form poles 55, 56 and drive magnetic flux across a radial magnetic airgap defined between the pairs of magnets 55 and 56. An air core armature 58 is attached at one end thereof to a stationary support, such as a housing 64, and extends into the armature airgap 57. The armature 58 has windings of specialized multiple individually insulated strand conductor wire, to be described in further detail later. The cylinders 53, 54 are attached to a shaft 59 that is supported for rotation by bearings 60, 61. The bearings are mounted to the housing 64 of the motor-generator 50. Wires 62 from the armature 58 connect to an external electric box 63 for electrical connection.

Figure 3A:
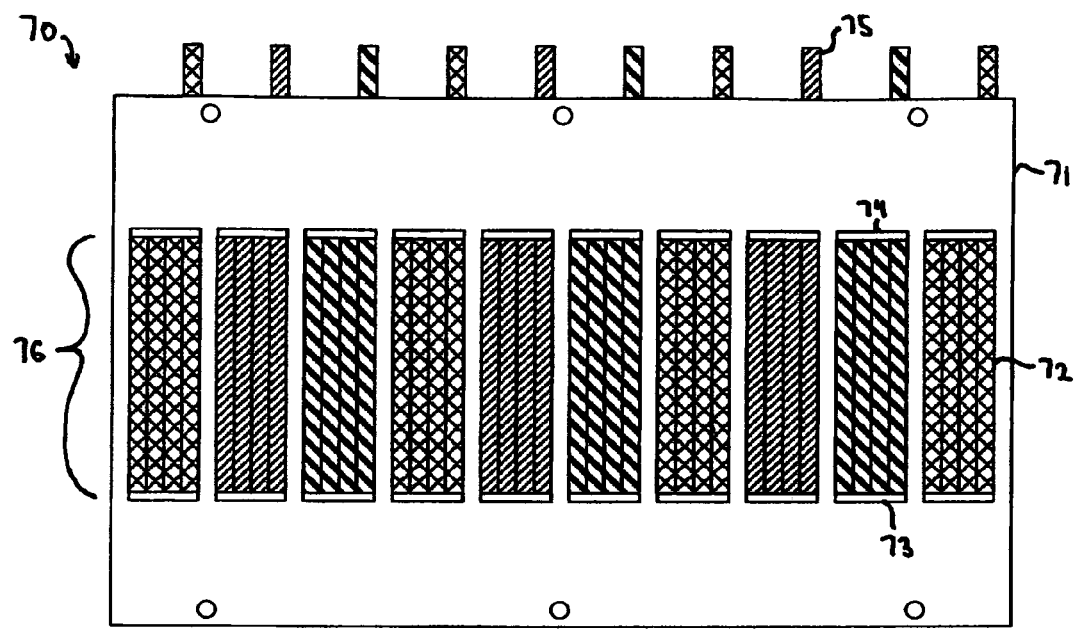
FIG. 3A is a schematic developed elevation of one side of an air core armature in accordance with the invention, usable in the radial gap double rotating air core motor-generator of FIG. 2.
Figure 3B:
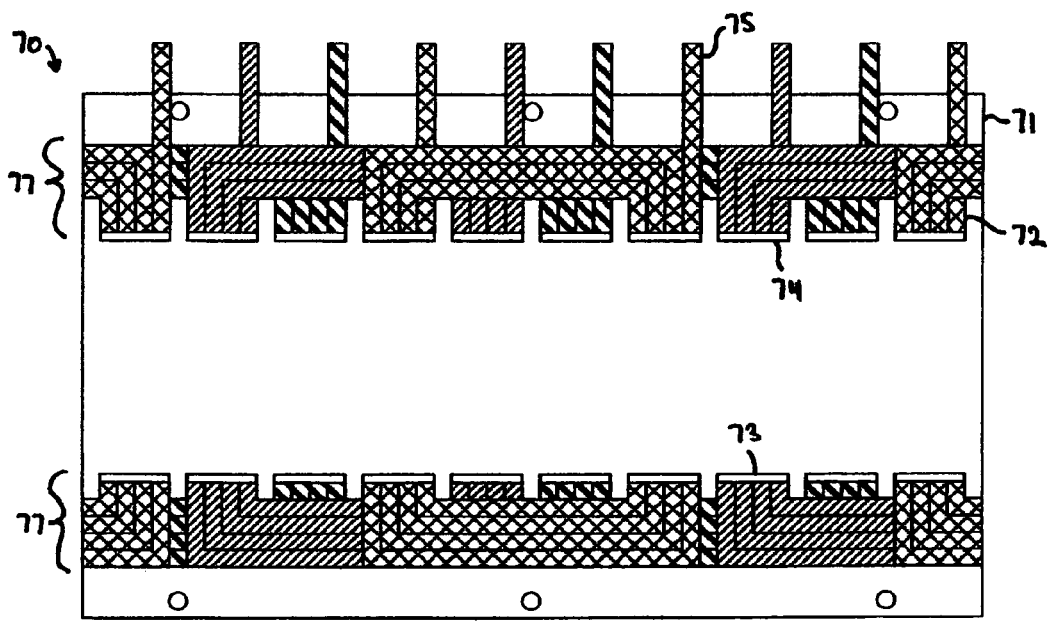
FIG. 3B is a schematic developed elevation of other side of the air core armature shown in FIG. 3A.

Although the air core armatures of double rotating air core motor-generators can structurally be made by several different means, including bonding, potting, etc, a preferred construction in accordance with the invention is winding the windings onto nonmagnetic forms. This allows the windings to be structurally held in place when a strong bond with the windings is difficult. An air core armature 70, shown in FIGS. 3A and 3B in developed or "unrolled" shape for clarity of illustration, is comprised of specialized wire windings 72 wound onto a thin fiberglass laminate form 71. As shown, the windings 72 comprise active lengths 76 that are located in the magnetic airgap when installed in a motor-generator, such as the motor-generator 50 of FIG. 2, and end turns 77 that circumferentially connect together the active lengths 76. The windings 72 are wound such that they pass through holes 73, 74 that provide structural support. Power is connected to the windings 72 by leads 75.

Figure 4:
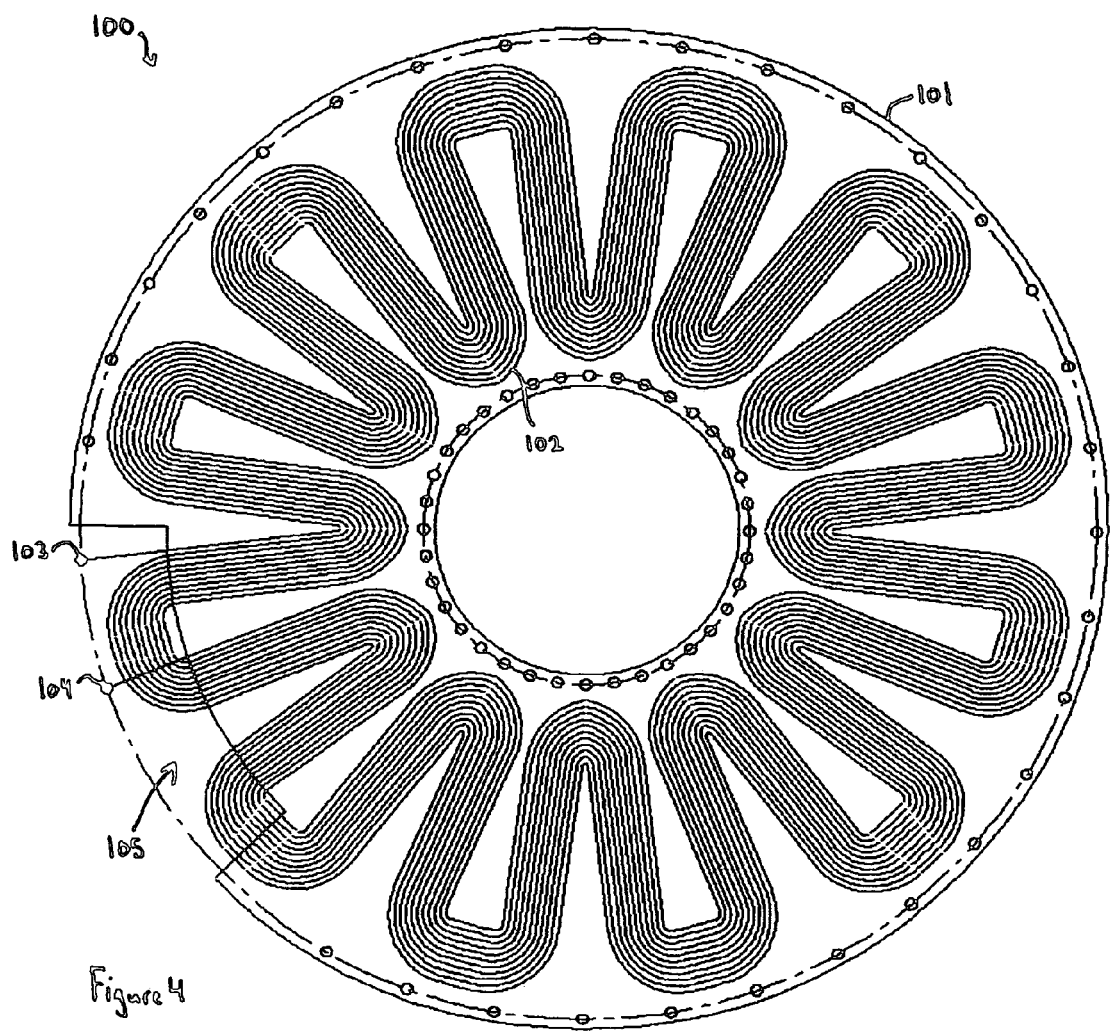
FIG. 4 is a schematic drawing of an air core armature in accordance with the invention, usable in the axial gap double rotating air core motor-generator of FIG. 1.

Another configuration air core armature 100, particularly suited for axial gap motor generators such as the motor-generator 30 shown in FIG. 1, is shown in FIG. 4. In this construction, the armature 100 again utilizes a form to support the windings 102 so as not to completely rely on bonding to the windings for structural support when in operation. The windings 102 are wound by laying the wires into channels cut or formed into a nonmagnetic plastic form 101. The form is later installed with windings in double rotating air core motor-generators. As shown, the windings have a start 103 and an end lead 104. A section 105 of the form 101 is omitted to allow for overlapping of the exiting lead 104.

Figure 5:
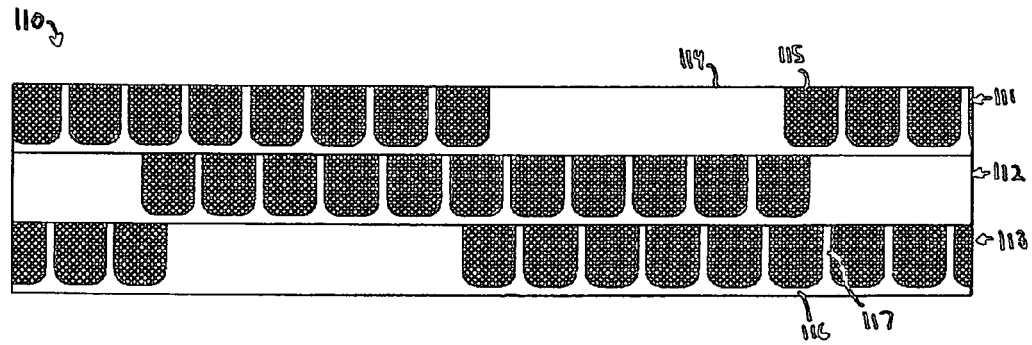
FIG. 5 is a schematic drawing of another configuration air core armature with three-phase stacking in accordance with the invention.

For a three-phase motor-generator, three forms with windings are assembled together. An alternate configuration air core armature with three-phase stacking in accordance with the invention is shown in FIG. 5. The armature 110 is comprised of three phases 111, 112, 113 that are stacked together. Each phase 111, 112, 113 has a form 114 with specialized windings 115. The form 114 has a thin backing portion 116 and raised channels walls 117 such that the windings 115 lie in between the channel walls 117.

Figure 6:
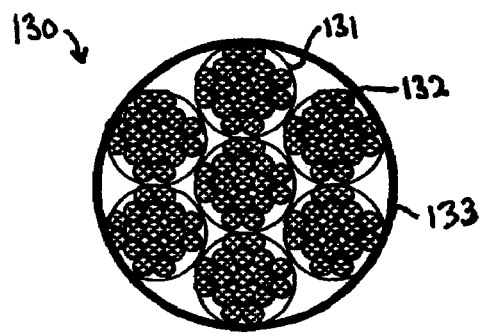
FIG. 6 is a schematic sectional end elevation of a winding wire for an air core armature in accordance with the invention.
Figure 7:
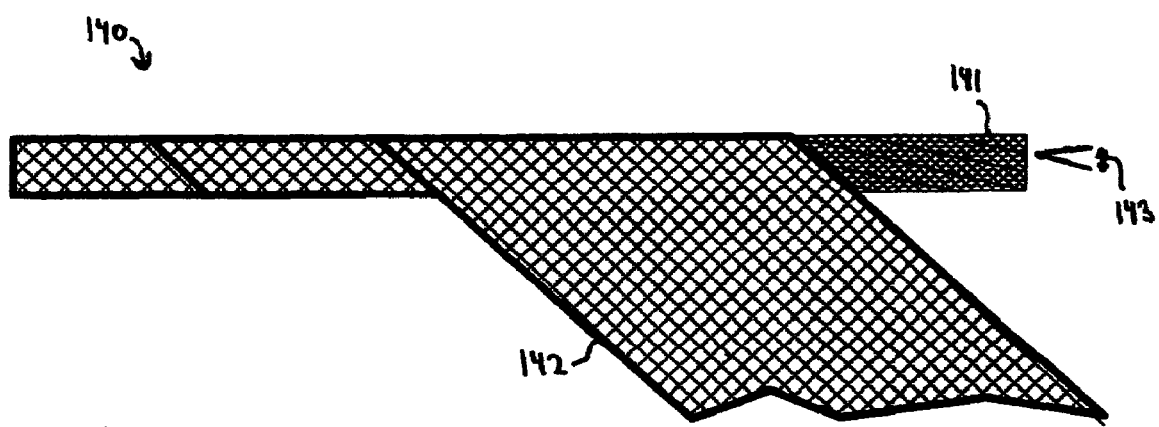
FIG. 7 is a schematic side elevation of a winding wire for an air core armature in accordance with the invention.

A winding wire for an air core armature in accordance with the invention is shown in end view and side view in FIGS. 6 and 7. The wire 130 is comprised of multiple individually insulated strands 132. Although preferable to assemble all strands in one operation, it is typically not practical. As a result, the strands 132 are first assembled in groups 131 of strands 132 that are twisted together. The groups 131 are then assembled together to form the final bundled wire 130. Surrounding the total bundle of strands 132 is an outer serve 133. The serve 133 provides dielectric strength and corona inception voltage protection of the wire when wound into the motor-generator air core armature. In one embodiment, the outer serve is preferably constructed from a tape wound film such as Mylar. Tape wound serves provide a thinner thickness to allow for more winding strands in the armature, allow some flexibility for winding the tight curves in the armature and provides a higher dielectric strength per thickness than extruded serves.

FIG. 7 shows a winding wire 140, like the wire winding 130, being tape wrapped with a film 142 over the strands 141, like the strands 132. Air core motor-generator armatures, especially for larger motors, are unique in that they require the use of large cross-sectional area of wire and also require tight bends and high compactability to achieve high efficiency and performance and to reduce magnet costs by minimizing the required magnetic airgap. The flexibility of the windings can be further increased by increasing the lay length or wire length per twist of the strands and/or groups of strands. The lay lengths are preferably constructed to be greater than 4 inches and more preferably greater than 12 inches. This twist is denoted by the angle 143 shown. The twisting of the strands in each group and the twisting of the groups of strands can be twisted in the same direction. Unlike typical cabling where opposite direction twisting is used, this method makes the winding wire 140 more flexible and compressible for easier larger air core armature manufacturing. The wire 140 can also be pre-compressed into a rectangular cross-section prior to winding the armature. Pre-compression can reduce the required pressure on the whole armature after winding to form a thin and dense air core armature.

Figure 8:
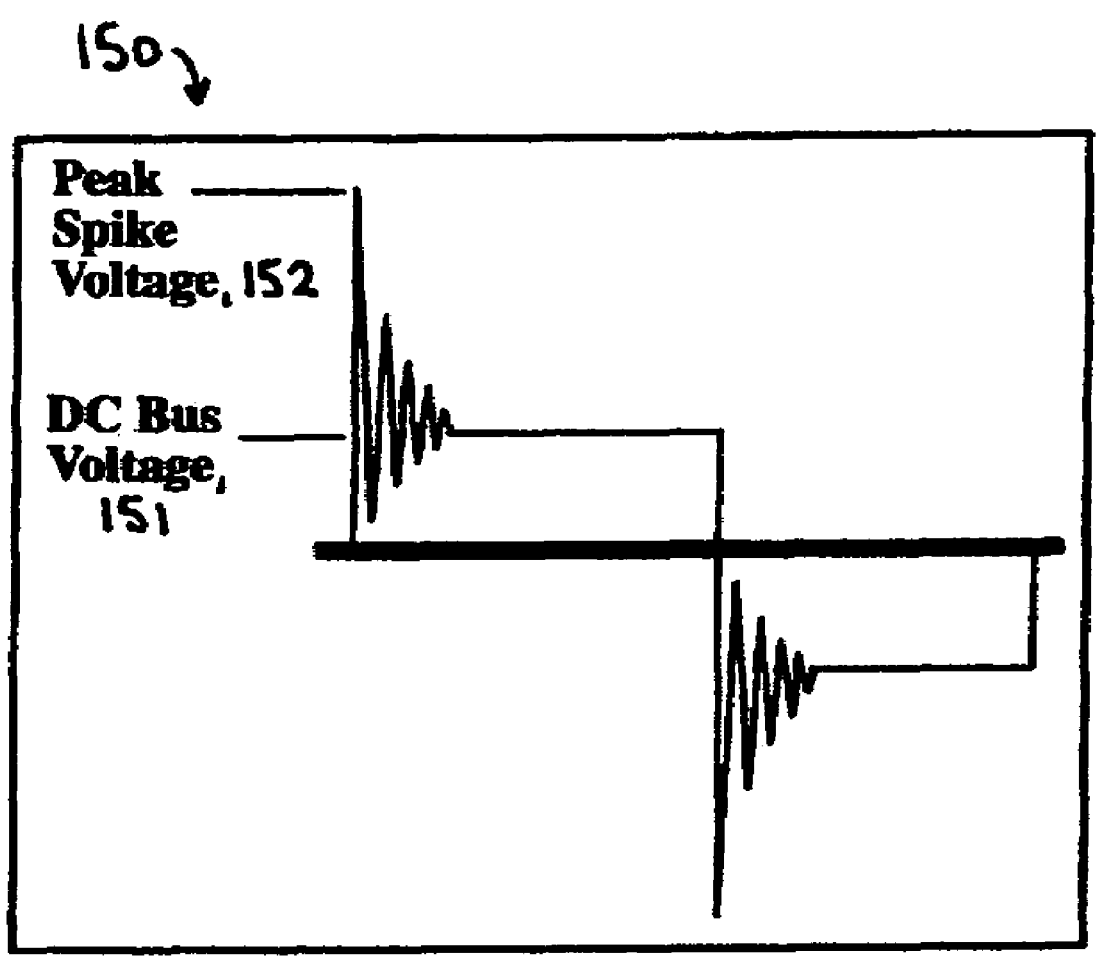
FIG. 8 is a graph showing the over voltage from a motor drive inverter to the windings of an air core armature of a motor-generator in accordance with the invention.

The over voltage from a motor drive inverter to the windings of an air core armature of a motor-generator in accordance with the invention is shown in FIG. 8. With the advent and growth of IGBT based variable speed drive inverters to control motors, voltage spikes to motor armature windings has increased, making armature failures a problem to be considered in manufacturing. The over voltage 150 is shown with a peak spike voltage 152 being much larger than the DC bus voltage 151 of the motor drive. These switching spikes stress the windings and are a cause of armature failures that are prevented through the use of windings in accordance with the invention.

Figure 9:
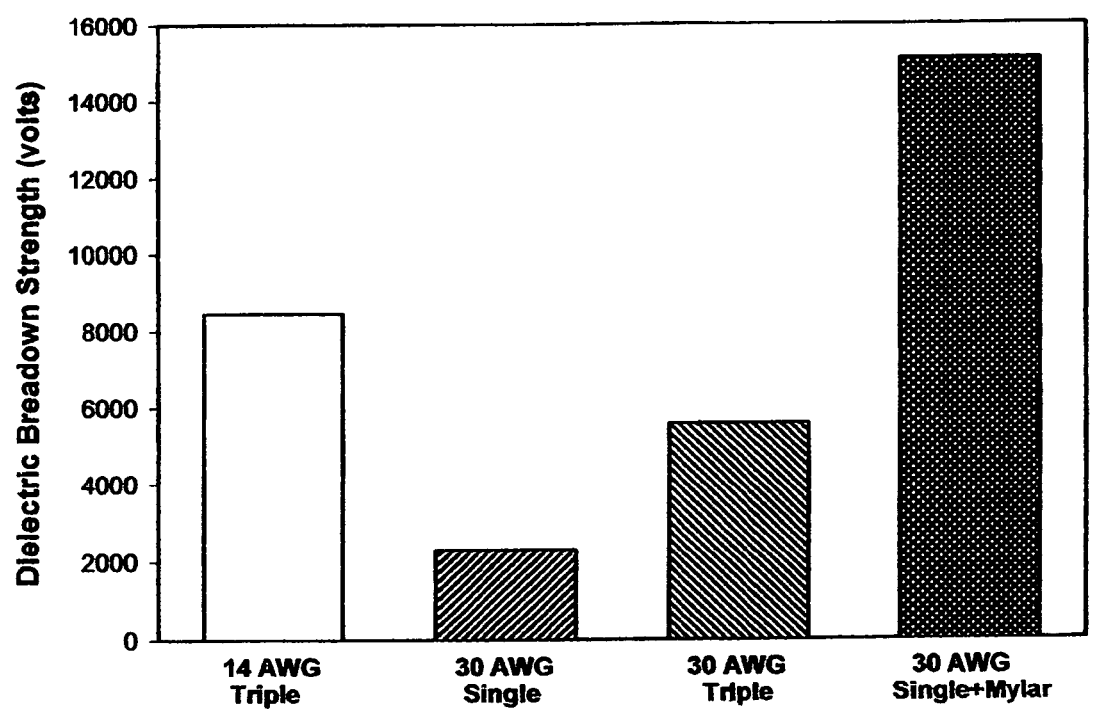
FIG. 9 is a graph showing a comparison of the dielectric breakdown strength of different winding wire configurations.

A comparison of the dielectric breakdown strength of different winding wire configurations is shown in FIG. 9. A large diameter solid conductor of 14 gauge used in a conventional configuration motor provides an insulation dielectric breakdown strength of 8450 volts. In comparison, a 30 gauge wire from a Litz bundle with single or triple build insulation provides dielectric breakdown strength of only 2300 volts and 5550 volts, respectively. The smaller diameter limits the breakdown strength even with a triple build. To achieve sufficient dielectric strength for long term operation in a double rotating air core motor-generator, a combination insulation can be utilized. By adding the outer tape wrapped film over the wire bundle with only a single build film enamel on the 30 AWG wires, a substantially improved dielectric strength results. The 30 AWG wires with single build and a Mylar over wrapped film provides a dielectric breakdown strength of approximately 15,000 volts, nearly twice as high as the conventional motor larger wire with triple build and sufficient for long term operation of the air core motor-generator.

Figure 10:
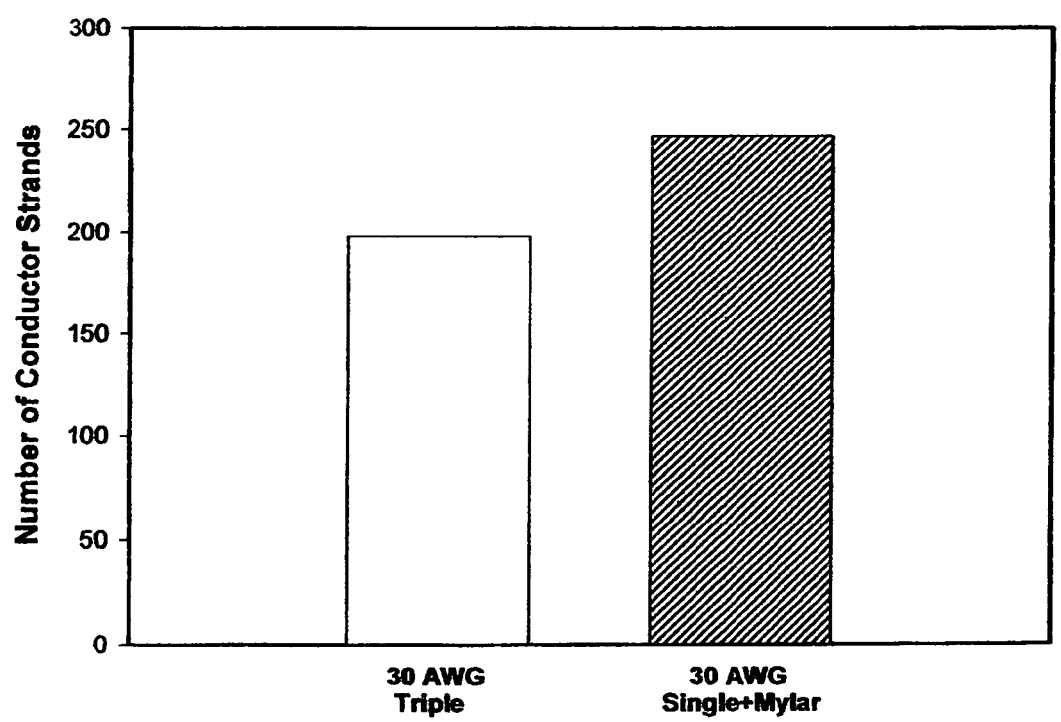
FIG. 10 is a graph showing a comparison of the winding density potential between different winding wire configurations.

Usually in engineering, the improvement of one attribute of a component results in the degradation or lowering of the performance of the other attributes. Surprisingly, this has been found to be not the case. A comparison of the winding density potential between different winding configurations is shown in FIG. 10. For a specific design double rotating air core motor, the number of Litz strands that can be utilized in the armature windings due to the cross sectional area space is shown for two insulation methods. Both wires utilize the same AWG 30 strands. The unserved bundle employing a triple build enamel strand insulation for boosting the dielectric strength allows for only 200 strands. In contrast, the served wire with only single build enamel insulation but with outer taped wrapped Mylar film, in accordance with the invention, achieves 245 strands in the same area, 22.5% increase. The increased number of strands reduces the armature resistance and provides a significant improvement in the efficiency and power capability. It also does this with a higher dielectric breakdown strength as shown previously in FIG. 9.

The reason behind the increased strand capability and winding density has to do with the location of the dielectric insulation and the functioning of the armature. Adding heavier build enamel to the individual strands does increase the resistance against dielectric breakdown between adjacent winding turns. However, it also adds unnecessary additional insulation between strands in locations at the middle of the wire bundle. This does not improve the turn to turn dielectric breakdown strength of the wire and it substantially reduces the area available for copper. With smaller diameter strands, the effect of the insulation area on the wire becomes increasingly substantial, reducing the windings density potential.

For the outer tape wrapped film insulation, the motor-generator windings receive the increased dielectric strength only where it is effective against turn to turn breakdown, specifically at the outer diameter of the wire bundle. The outer film does reduce the area available for copper in the wire, however the insulation on the surface of the strands can be maintained at only a single build. Surprisingly, it has been found that the combination of these effects results in an increased windings density potential as shown in FIG. 10 and increased turn-to-turn dielectric breakdown strength, as shown in FIG. 9.

One of the crucial parameters for the construction of high performance and cost effective double rotating air core motor-generators is the ability to achieve high armature windings density not only in the individual wire bundle, but also in the windings patterns themselves. To wind into a maximally filled air core armature, the windings must preferably be able to achieve tight bends to prevent unused wasted space. As the size of motor-generators are increased to larger commercial industrial sizes, the armature windings wire diameter increases, dramatically reducing the wire bending capability and hence armature windings density. The use of stranded small diameter wires in the Litz bundle compared with a conventional motor solid conductors provides much higher flexibility. However, the addition of the outer insulating serve, in accordance with the invention, can unfortunately substantially reduce the wire flexibility and interfere with achieving high density tight bends.

Figure 11:
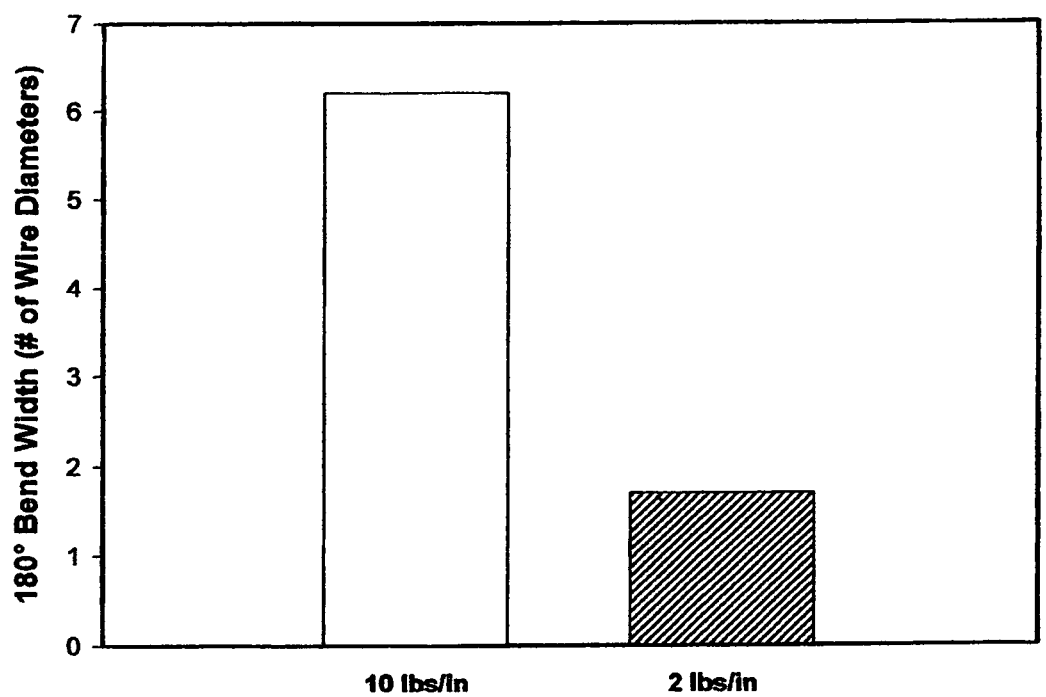
FIG. 11 is a graph showing a comparison of the 180° bend width between different winding wire configurations.

To overcome the loss of windings flexibility with the use of an outer insulating serve, I have found an effective solution by looking at the mechanism causing the loss of flexibility resulting from the added serve. The insulating serve, whether extruded or tape wrapped, radially compresses the bundle of strands. The radial compression increases the friction between individual strands against sliding and it also prevents reorientation of the strands in the bundle. The resistance to sliding and reorientation of the strands prevents the wire from being capable of bending to the same tight radius as without the serve. We have found that a serve applied from tape wrapped film can increase the flexibility over an extruded serve. The layers of the tape film allow for sliding of the film when the wire is bent around a tight radius in the armature. In yet a further embodiment, we have found that the bending capability of the winding wire can be even further substantially improved by applying an uncommonly low tension to the tape film during the wire construction process. Very low tension on the tape wrapping still maintains the desired dielectric breakdown strength capability of the wire however it both improves the tape sliding when bent and increase the strand sliding and reorientation capability. A comparison of the 180° bend width (the minimum distance between adjacent wire centers when the wire is bent in 180°) between winding wire configurations is shown in FIG. 11. As shown, equivalent 500 strand 30 AWG bundles both utilizing 50% overlap outer 1 mil Mylar serves are compared with different serve tape tensions. When the serve is applied with a tape tension of 10 pounds per inch width, the 180° bend width is approximately 6 wire diameters. This results in substantial empty unusable space in the air core armature, lowering the potential efficiency and power capability of the double rotating air core motor-generator. When the tape tension is reduced to only 2 pounds per inch width, the 180° bend width is reduced to approximately only 1.7 wire diameters. This provides more than a 3 times improvement, for a significantly higher density armature.

Figure 12:
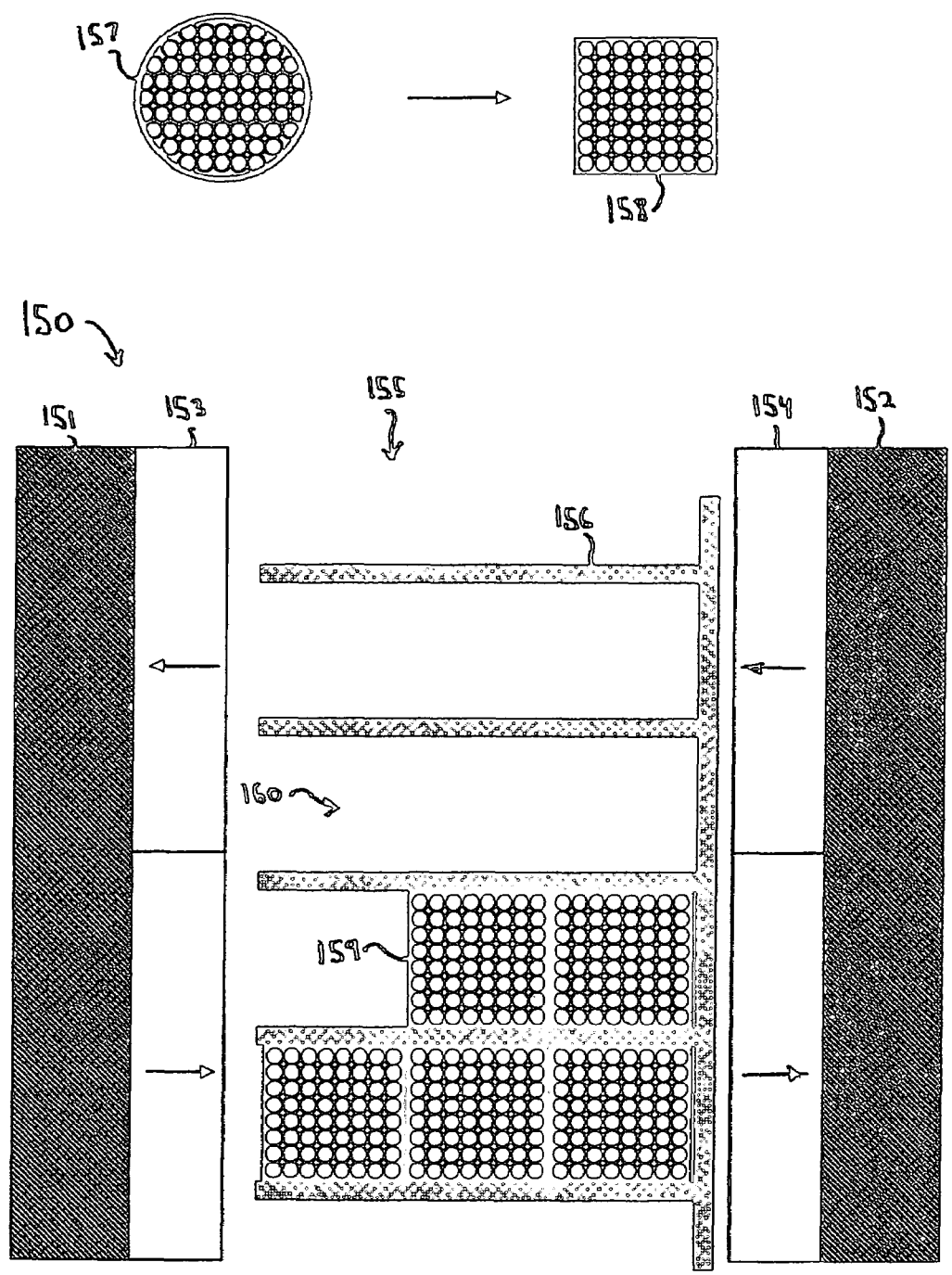
FIG. 12 is a schematic sectional drawing of an air core motor-generator in accordance with the invention.

In some case, it is possible to increase the armature windings density by precompressing the winding wire into a square or rectangular shape prior to winding. The precompression is accomplished by pulling the wire through set width precompressing rollers in the wire construction process. The precompressed wire can be utilized with the served Litz for the double rotating air core motor generator with form armature. The precompression prior to armature windings reduces the final applied pressure on the armature that is required to achieve the same high density. Final pressure applied to the armature can potentially be eliminated. A double rotating air core motor-generator section in accordance with the invention is shown in FIG. 12. The motor-generator section 150 is comprised of two steel rotor sections 151, 152. Attached to the rotor section 151, 152 are rotor magnet arrays 153, 154 that drive flux back and forth across an armature airgap 155 formed therebetween. Located in the armature airgap 155 is an air core armature form 156 constructed from substantially nonmagnetic and low electrical conductivity material to prevent magnetic induced losses. Initially constructed served Litz wire is assembled and precompressed into rectangular cross section wire 158 for winding. The rectangular compressed wire 158 is wound into the form 156 to form the windings 159 of the motor-generator 150. The windings 159 can be placed into slots or channels 160 in the form 156 for a neat, compact and highly dense air core armature. The high windings density of the air core armature provides higher efficiency and power capability for the double rotating air core motor-generator.

Although shown with permanent magnet excited double rotating air core motor/generators, the invention is also suited for use in electrically excited double rotating air core motor-generators as well, since they have the same requirements and constraints. Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims.

wherein I claim:

1. A motor-generator for converting between electrical and rotational energy comprising:

a rotor that rotates in a housing about an axis of rotation, and a stator that is stationary and magnetically acts upon said rotor;

said rotor is constructed of two spaced apart co-rotating rotor portions that define therebetween an armature airgap, and magnetic poles on said rotor portions that drive magnetic flux across said armature airgap;

said stator comprises an air core armature having a substantially nonmagnetic form with a free end and a support end, wherein said support end is coupled to the housing of said motor-generator and said free end extends into said armature airgap inside said rotor;

said air core armature further comprising windings that are wound on to said form, said windings having active length portions that generate electromagnetic torque from interaction with the magnetic flux of said magnetic poles and end turn portions that circumferentially connect said active length portions, wherein said form transfers said electromagnetic torque of said active length portions of said windings to said housing;

said windings are wound using wire formed of bundled individually insulated conductors, wherein said conductors are electrically connected in parallel but are electrically insulated between each other along their length in said active length portions, and said conductors of said wire are held together on said form by an outer insulating serve constructed from resin impermeable insulating material wherein said active length portions are substantially free from resin impregnation;

AC voltage is induced in said windings as said rotor rotates.

2. A motor-generator as described in claim 1 wherein:

said outer insulating serve utilizes a spiral tape wrapped film wherein said spiral tape wrapped film is loosely applied onto said wire with a tension of less than 10 pounds per inch of film width.

3. A motor-generator as described in claim 1 wherein:

said conductors in said wire are in multiple groups of twisted strands, each of the groups being twisted together to form the wire and the groups of strands being twisted in the same direction as the twisting of the strands in each group.

4. A motor-generator as described in claim 1 wherein:
said individually insulated conductors are twisted together and said twisting utilizes a lay length of greater than 4 inches.

5. A motor-generator as described in claim 1 wherein:
said form includes rectangular channels for said windings and said wire is compacted into an approximately equivalent rectangular cross-section prior to winding said windings into channels on said form.

6. A motor-generator as described in claim 1 wherein:
said outer insulating serve provides dielectric breakdown strength of greater than 10,000 volts.

7. A motor-generator as described in claim 1 wherein:
said windings utilize individual wire bends on said form that are greater than 120 degrees in spaces of less than 5 times the wire diameter, said bends occurring approximately perpendicular to said magnetic flux.

8. A motor-generator as described in claim 1 wherein:
said form utilizes channels to hold said windings wherein multiple phases of said windings are wound in said channels and said outer insulating serve provides separation of said conductors of different phases.

9. A motor-generator for converting between electrical and rotational energy comprising:
a rotor that rotates about an axis of rotation, and a stator that is stationary and magnetically acts upon said rotor,
said rotor is constructed of two spaced apart rotor portions that define therebetween an armature airgap, and magnetic poles on said rotor portions drive magnetic flux across said armature airgap;
said stator comprises an air core armature having a substantially nonmagnetic form with a free end and a support end, wherein said support end is coupled to the housing of said motor-generator and said free end extends into said armature airgap inside said rotor;
said air core armature further comprising windings that are wound on to said form, said windings having active length portions that generate electromagnetic torque from interaction with the magnetic flux of said magnetic poles and end turn portions that circumferentially connect said active length portions, wherein said form transfers said electromagnetic torque of said active length portions of said windings to said housing;
said windings are wound using wire formed of bundled individually insulated conductors, wherein said conductors are electrically connected in parallel but are electrically insulated between each other along their length in said active length portions, wherein said conductors of said wire are held together on said form by an outer insulating serve using a spiral tape wrapped film;
wherein AC voltage is induced in said windings as said rotor rotates.

10. A motor-generator as described in claim 9 wherein:
said outer insulating serve provides dielectric breakdown strength of greater than 10,000 volts.

11. A motor-generator as described in claim 9 wherein:
said spiral tape wrapped film is loosely applied onto said wire with a tension of less than 10 pounds per inch of film width.

12. A motor-generator as described in claim 9 wherein:
said individually insulated conductors are twisted together and said twisting utilizes a lay length of greater than 4 inches.

13. A motor-generator as described in claim 9 wherein:
said windings include individual bends of said wire on said form that are greater than 120 degrees spaces of less than 5 times the wire diameter, said bends occurring approximately perpendicular to said magnetic flux.

14. A motor-generator as described in claim 9 wherein:
said form has channels to hold said windings wherein multiple phases of said windings are wound in said channels and said outer insulating serve separates said conductors of different phases.

15. A motor-generator for converting between electrical and rotational energy comprising:
a rotor that rotates about an axis of rotation, and a stator that is stationary and magnetically acts upon said rotor,
said rotor is constructed of two spaced apart rotor portions that define therebetween an armature airgap, and magnetic poles on said rotor portions drive magnetic flux across said armature airgap;
said stator comprises an air core armature having a substantially nonmagnetic form with a free end and a support end, wherein said support end is coupled to the housing of said motor-generator and said free end extends into said armature airgap inside said rotor,
said air core armature further comprising windings that are wound on to said form, said windings having active length portions that generate electromagnetic torque from interaction with the magnetic flux of said magnetic poles and end turn portions that circumferentially connect said active length portions, wherein said form transfers said electromagnetic torque of said active length portions of said windings to said housing;
said windings are wound using wire formed of bundled individually insulated conductors, wherein said conductors are electrically connected in parallel but are electrically insulated between each other along their length in said active length portions, wherein said conductors of said wire are held together on said form by an outer insulating serve;
said wire is comprised of multiple groups of twisted conductors, each said group of conductors is twisted together to form said wire and said groups of conductors are further twisted in the same direction as the twisting of the conductors in each said group.

16. A motor-generator as described in claim 15 wherein:
said outer insulating serve is constructed from resin impermeable insulating material and said active length portions are substantially free from resin impregnation.

17. A motor-generator as described in claim 15 wherein:
said outer insulating serve provides dielectric breakdown strength of greater than 10,000 volts.

18. A motor-generator as described in claim 15 wherein:
said individually insulated conductors are twisted together and said twisting utilizes a lay length of greater than 4 inches.

19. A motor-generator as described in claim 15 wherein:
said windings utilize individual wire bends on said form that are greater than 120 degrees in spaces of less than 5 times the wire diameter, said bends occurring approximately perpendicular to said magnetic flux.

20. A motor-generator as described in claim 15 wherein:
said form includes rectangular channels for said windings and said wire is compacted into an approximately equivalent rectangular cross-section prior to winding said windings into channels on said form.

* * * * *